United States Patent
Vos et al.

(10) Patent No.: US 11,960,385 B2
(45) Date of Patent: Apr. 16, 2024

(54) AUTOMATIC GENERATION OF INTEGRATED TEST PROCEDURES USING SYSTEM TEST PROCEDURES

(71) Applicant: The Boeing Company, Chicago, IL (US)

(72) Inventors: Maxim Constantijn Vos, Madrid (ES); Barend-Jan van Bruchem, Madrid (ES); Pieter van Gils, Madrid (ES); Daniel Ramiro Rebollo, Madrid (ES); Can Onur, Munich (DE)

(73) Assignee: THE BOEING COMPANY, Chicago, IL (US)

( * ) Notice: Subject to any disclaimer, the term of this patent is extended or adjusted under 35 U.S.C. 154(b) by 79 days.

(21) Appl. No.: 17/675,426

(22) Filed: Feb. 18, 2022

(65) Prior Publication Data
US 2022/0269593 A1    Aug. 25, 2022

(30) Foreign Application Priority Data
Feb. 24, 2021 (EP) ................................. 21382157

(51) Int. Cl.
*G06F 11/36* (2006.01)
*G06F 11/22* (2006.01)
*G06F 11/263* (2006.01)

(52) U.S. Cl.
CPC ........ *G06F 11/3684* (2013.01); *G06F 11/368* (2013.01); *G06F 11/3688* (2013.01)

(58) Field of Classification Search
CPC ............... G06F 11/3684; G06F 11/368; G06F 11/3688; G06F 11/3676; G06F 11/3696;
(Continued)

(56) References Cited

U.S. PATENT DOCUMENTS 5,652,835 A    7/1997 Miller
6,182,258 B1   1/2001 Hollander
(Continued)

FOREIGN PATENT DOCUMENTS

| CN | 110633206 A | * | 12/2019 | .......... G06F 11/3676 |
| DE | 102020205539 A1 | * | 11/2021 | .......... G06F 11/0772 |
| EP | 3722942 A1 | | 10/2020 | |

OTHER PUBLICATIONS

Extended European Search Report dated Jul. 29, 2021 for European Patent Application No. 21382157.2, 11 pages.
(Continued)

*Primary Examiner* — Daxin Wu
(74) *Attorney, Agent, or Firm* — Sage Patent Group

(57) ABSTRACT

A method for automatic generation of integrated test procedures using system test procedures includes generating a system test case for each system model of a plurality of system models. The method also includes automatically generating an integrated test harness including a group of interacting system models of the plurality of system models. An output signal from one or more of the interacting system models is an input signal to one or more other interacting system models. The method additionally includes automatically generating an integrated test case for each system model in the integrated test harness and automatically running the integrated test case using an integrated test procedure. The method further includes generating an integrated test procedure coverage report in response to running the integrated test case.

20 Claims, 13 Drawing Sheets

(58) Field of Classification Search
CPC ............ G06F 11/2273; G06F 11/2257; G06F 11/2268; G06F 11/263
See application file for complete search history.

(56) References Cited

U.S. PATENT DOCUMENTS

| | | | |
|---|---|---|---|
| 6,804,634 B1 | 10/2004 | Holzmann et al. | |
| 10,599,546 B1* | 3/2020 | Walther | G06F 11/3457 |
| 10,678,666 B1* | 6/2020 | Gauf | G06F 11/2635 |
| 11,055,207 B2 | 7/2021 | Ramiro Rebollo et al. | |
| 2006/0242525 A1 | 10/2006 | Hollander et al. | |
| 2008/0209369 A1 | 8/2008 | Sugihara | |
| 2008/0270954 A1 | 10/2008 | Habib et al. | |
| 2009/0172647 A1 | 7/2009 | Telang | |
| 2009/0193389 A1* | 7/2009 | Miller | G06F 11/3684 |
| | | | 717/104 |
| 2011/0083121 A1 | 4/2011 | Dixit et al. | |
| 2011/0125448 A1 | 5/2011 | Jung | |
| 2013/0042222 A1 | 2/2013 | Maddela | |
| 2016/0062861 A1 | 3/2016 | Tegethoff | |
| 2016/0170864 A1* | 6/2016 | Li | G06F 11/3684 |
| | | | 717/126 |
| 2017/0147482 A1* | 5/2017 | Li | G06F 8/20 |
| 2018/0196739 A1* | 7/2018 | Li | G06F 8/20 |
| 2020/0034273 A1* | 1/2020 | Li | G06F 11/3676 |
| 2021/0326228 A1* | 10/2021 | Metin | G06F 11/3608 |

OTHER PUBLICATIONS

Rathinakumar, V et al., "Validating VCP using Model Based Approach," 2015 2nd International Conference on Computing for Sustainable Global Development (Indiacom), Bharati Vidyapeeth, New Dehli, India, Mar. 11, 2015, pp. 912-917.

Rubinov, Konstantin, "Generating Integration Test Cases Automatically," FSE-18, Nov. 7-11, 2010, Santa Fe, New Mexico, USA, 4 pages.

Pezze, Mauro, et al., "Generating Effective Integration Test Cases from Unit Ones," 2013 IEEE Sixth International Conference on Software Testing, Verification and Validation, 10 pages.

Extended European Search Report dated Oct. 17, 2019 for European Patent Application No. 19382265.7, 10 pages.

Aeronautical Radio, Inc., Guidance for Design of Aircraft Equipment and Software for Use in Training Devices, ARINC Report 610C, Sep. 11, 2009, 146 pages.

Moore, Jason et al., "White Paper: 11 Best Practices for Developing ISO 26262 Applications with Simulink," MathWorks Consulting, 2019, 17 pages.

Gongee, Gao et al., "Research on Automoatic Generation of Test Cases," 2012 IEEE/ACIS 11th International Conference on Computer and Information Science, 4 pages.

Conformiq, Conformiq Test Automation, last updated May 6, 2021, downloaded on Feb. 16, 2022 from: https: www.verifysoft.com.en_conformiq_automatic_test_generation.html, 2 pages.

Rane, Prerana Pradeepkumar, Thesis, Virginia Polytechnic Institute and State University, "Automatic Generation of Test Cases for Agile using National Language Processing," Mar. 14, 2014, 97 pages.

Keyvanpour, Mohammad Reza et al., "Automatic Software Test Case Generation," Journal of Software Engineering, Mar. 2011, downloaded on Feb. 16, 2022 from: https:www.researchgate.net/publication/269906577_Automatic_Test_Case_Generation, 13 pages.

Canadian Office Action, Canadian Application No. 3,144,852, mailed Feb. 1, 2024, 6 pages.

* cited by examiner

| | (INPUTS) | | (EXPECTED OUTPUT) |
|---|---|---|---|
| | IN_AIR [-] | OUTSIDE_AIR_TEMP [degC] | TC_SOV_COMMAND [%] |
| TP-B STEP 1 | TRUE | 0 | 100 |
| TP-B STEP 2 | TRUE | 5 | 0 |
| TP-B STEP 3 | TRUE | 10 | 0 |
| TP-B STEP 4 | FALSE | 0 | 0 |
| TP-B STEP 5 | FALSE | 5 | 0 |
| TP-B STEP 6 | FALSE | 10 | 0 |

FIG. 8A

| SIGNAL... | ...DEPENDS ON... | | | |
|---|---|---|---|---|
| | gs INPUT | ia INPUT | oat INPUT | sov OUTPUT |
| GROUNDSPEED gs INPUT | | | | |
| IN-AIR ia INPUT | 808 X | | | |
| OUTSIDE_AIR_TEMP oat INPUT | | | | |
| TC_SOV_COMMAND sov OUTPUT | | 810 X | 812 X | |

FIG. 8B

| SIGNAL... | ...DEPENDS ON... | | | |
|---|---|---|---|---|
| | gs ★ | ia INPUT | oat ★ | sov OUTPUT |
| GROUNDSPEED gs INPUT | | | | |
| IN-AIR ia INPUT | 808 X | | | |
| OUTSIDE_AIR_TEMP oat INPUT | | | | |
| TC_SOV_COMMAND sov OUTPUT | | 810 X | 812 X | |

AUTOMATIC GENERATION OF INTEGRATED TEST PROCEDURES USING SYSTEM TEST PROCEDURES

CROSS-REFERENCE TO RELATED APPLICATIONS

The present application claims benefit of priority to European Patent Application No. 21382157.2, filed Feb. 24, 2021.

The present application is related to U.S. Pat. No. 11,055,207 B2, titled Automatic Generation of Integration Tests from Unit Tests, and assigned to the same assignee as the present application.

BACKGROUND

The present disclosure relates to model-based development of a vehicle or system and more particularly to automatic generation of integrated test procedures using system test procedures during model-based development of a vehicle or system. During the Model-Based Development (MBD) of a vehicle, such as an airplane, or other system different systems of the vehicle or system are modelled as separate model systems. The model systems integrated together model the complete vehicle or system. System test procedures are executed manually and multiple times during system validation and verification for software and hardware in loop testing. This is a time consuming, and therefore, costly exercise. Additionally, integration testing of multiple and connected systems occurs late in the MBD process which leads to late discovery of integration issues and results in costly system requirement changes.

SUMMARY

In accordance with an example, a method for automatic generation of integrated test procedures using system test procedures includes generating, by a processor circuit, a system test case for each system model of a plurality of system models. The method also includes automatically generating, by the processor circuit, an integrated test harness including a group of interacting system models of the plurality of system models. An output signal from one or more of the interacting system models is an input signal to one or more other interacting system models. The method also includes automatically generating, by the processor circuit, an integrated test case using the system test case for each system model in the integrated test harness. The method additionally includes automatically running, by the processor circuit, the integrated test case using an integrated test procedure. The method further includes generating, by the processor circuit, an integrated test procedure coverage report in response to running the integrated test case.

In accordance with another example, a system for automatic generation of integrated test procedures using system test procedures includes a processor circuit and a memory associated with the processor circuit. The memory includes computer readable program instructions that, when executed by the processor circuit cause the processor circuit to perform a set of functions. The set of functions include generating a system test case for each system model of a plurality of system models. The set of functions also include automatically generating an integrated test harness including a group of interacting system models of the plurality of system models. An output signal from one or more of the interacting system models is an input signal to one or more other interacting system models. The set of functions also include automatically generating an integrated test case using the system test case for each system model in the integrated test harness. The set of functions also include automatically running the integrated test case using an integrated test procedure. The set of functions further include generating an integrated test procedure coverage report in response to running the integrated test case.

In accordance with an example and any of the preceding examples, the method and set of functions further include analyzing a correlation between one or more inputs and one or more outputs of the integrated test case to determine a group of critical inputs. The group of critical inputs are the inputs that are needed to affect each output of the integrated test case.

In accordance with an example and any of the preceding examples, the method and set of functions, wherein analyzing the correlation between the inputs and outputs of the integrated test case includes sorting the inputs and outputs using a clustering algorithm to determine the group of critical inputs.

In accordance with an example and any of the preceding examples, the method and set of functions further include automatically generating the integrated test procedure of the integrated test case. The integrated test procedure includes a combined subset of test steps of the system test cases which include the critical inputs.

In accordance with an example and any of the preceding examples, the method and set of functions further include automatically removing one or more superfluous test steps from the integrated test procedure to reduce a time duration for running the integrated test case. A superfluous test step is any test step of a particular system test case with a particular input value that provides a same output value as another test step with a different input value.

In accordance with an example and any of the preceding examples, the method and set of functions further include automatically generating the integrated test procedure with the one or more superfluous test steps removed. The integrated test procedure that results includes a coverage of critical inputs for expected outputs of the integrated test case.

In accordance with an example and any of the preceding examples, the method and set of functions further include receiving the plurality of system models. Each system model is configured to electronically simulate a certain function or a group of functions that the system is configured to perform.

In accordance with an example and any of the preceding examples, the method (100) and set of functions wherein each system model includes a certain logic circuit that defines the certain function or group of functions that the system is configured to perform.

In accordance with an example and any of the preceding examples, the method and set of functions wherein each system model is configured to generate one or more expected outputs in response to one or more inputs based on the certain logic circuit associated with a particular system model.

In accordance with an example and any of the preceding examples, the method and set of functions further include generating a system test harness for each system model of the plurality of system models. The system test case for each system model is generated from the system test harness for each system model.

In accordance with an example and any of the preceding examples, the method and set of functions wherein generating the system test case for each system model from the system test harness for each system model includes testing a particular system model separate from an environment of the particular system model so that the particular system model is tested independently from other system models that provide inputs to the particular system model.

In accordance with an example and any of the preceding examples, the method and set of functions further include automatically running the system test case using a system test procedure for each system model. The method and set of functions additionally include generating an expected output value for each of one or more outputs of each system model in response to an input value for each of one or more inputs of each system model for all combinations of possible different input values for each system model.

In accordance with an example and any of the preceding examples, the method and set of functions wherein the system test procedure includes at least one of a subsystem test procedure, a component test procedure, or a part test procedure.

In accordance with an example and any of the preceding examples, the method and set of function further include automatically generating a table or datastore for each system model independent from other system models in response to running the system test case for each system model. The table or datastore for a particular system model includes the expected output value for each of the one or more outputs associated respectively with the input value for each of the one or more inputs for each combination of possible different input values for the particular system model.

In accordance with an example and any of the preceding examples, the method and set of functions further include performing analysis of the integrated test procedure coverage report, and generating an integrated systems analysis report in response to performing analysis of the integrated test procedure coverage report.

In accordance with an example and any of the preceding examples, the method and set of functions wherein each of the plurality of system models corresponds to a system onboard an airplane or other vehicle.

The features, functions, and advantages that have been discussed can be achieved independently in various examples or may be combined in yet other examples further details of which can be seen with reference to the following description and drawings.

BRIEF DESCRIPTION OF THE DRAWINGS

FIGS. 8A and 8B illustrate an example of analyzing a correlation between inputs and outputs of the integrated test case in the example in FIG. 7 to determine critical inputs.

DETAILED DESCRIPTION

Figure 1A:
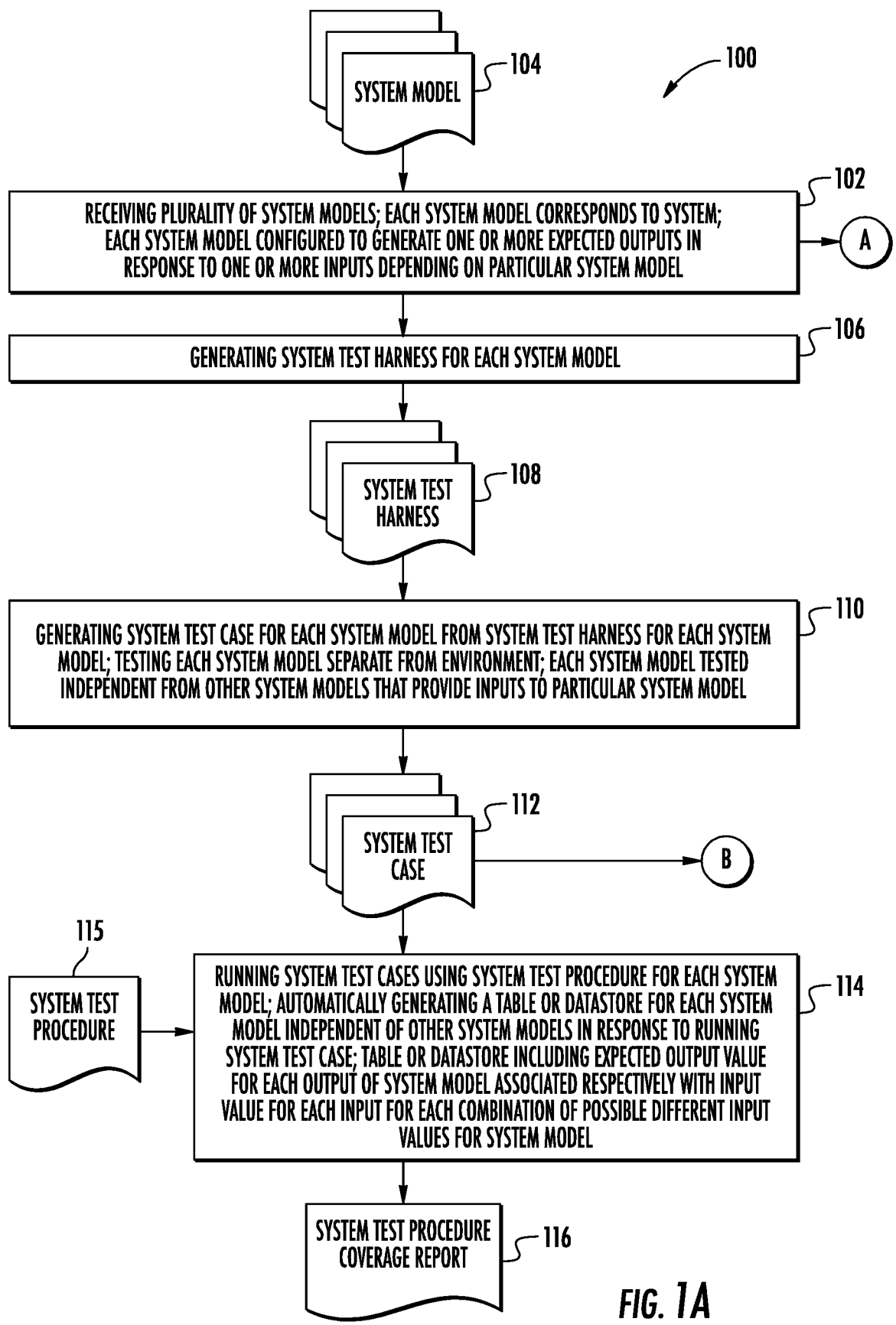
FIGS. 1A-1C are a flow chart of an example of a method for automatic generation of integrated test procedures using system test procedures in accordance with an example of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Systems, such as systems of a vehicle, e.g., an airplane, or other systems are tested using test procedures. The test procedures may be created manually by collaboration between subject matter experts and by other processes. The test procedures are executed manually and multiple times during development of a particular system or systems and during system validation and verification. In accordance with an example, the method and system of the present disclosure automate the execution of system test procedures resulting in time and cost savings. By automation of the test procedures, more scenarios can be evaluated resulting in full coverage of the functional requirements of each system. Additionally, the exemplary method and system as described herein automatically generate integrated test procedures for sets of systems using multiple test procedures for individual systems. The integrated test procedures test multiple related systems when integrated together. The exemplary method and system for automatic generation of integration test procedures using system test procedures of the present disclosure provide early and automated system integration testing resulting in early discovery of integration issues which lead to cost savings.

Figure 1B:
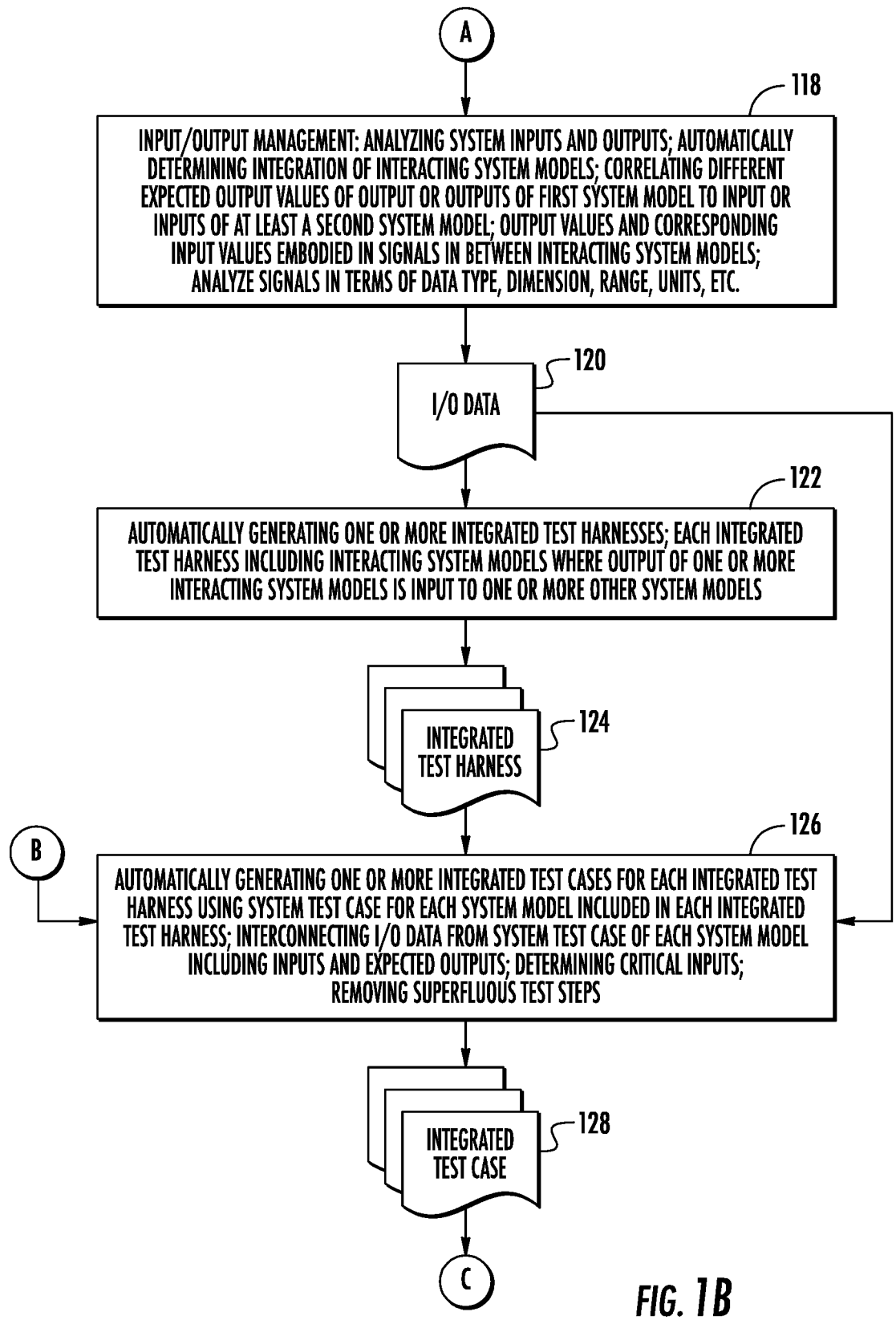
Figure 1C:
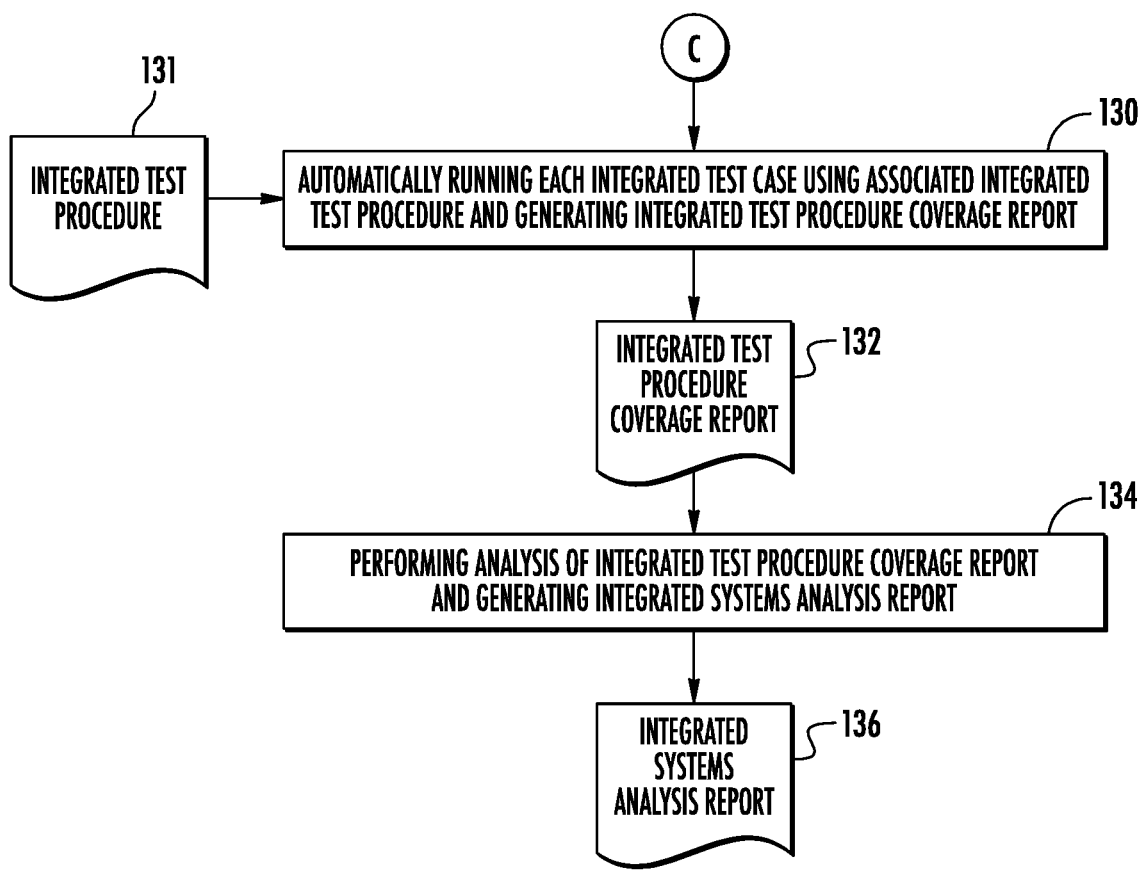
Figure 3A:
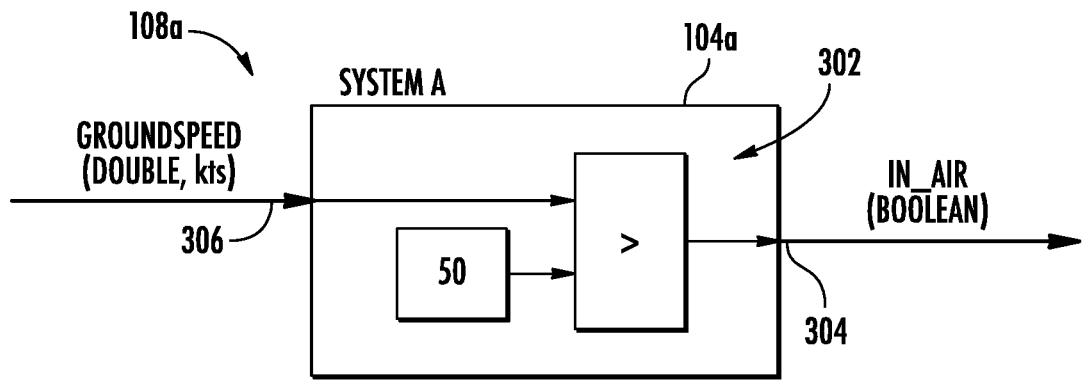
FIG. 3A is an example of a system test harness for a system A in accordance with an example of the present disclosure.
Figures 4A, 4B:
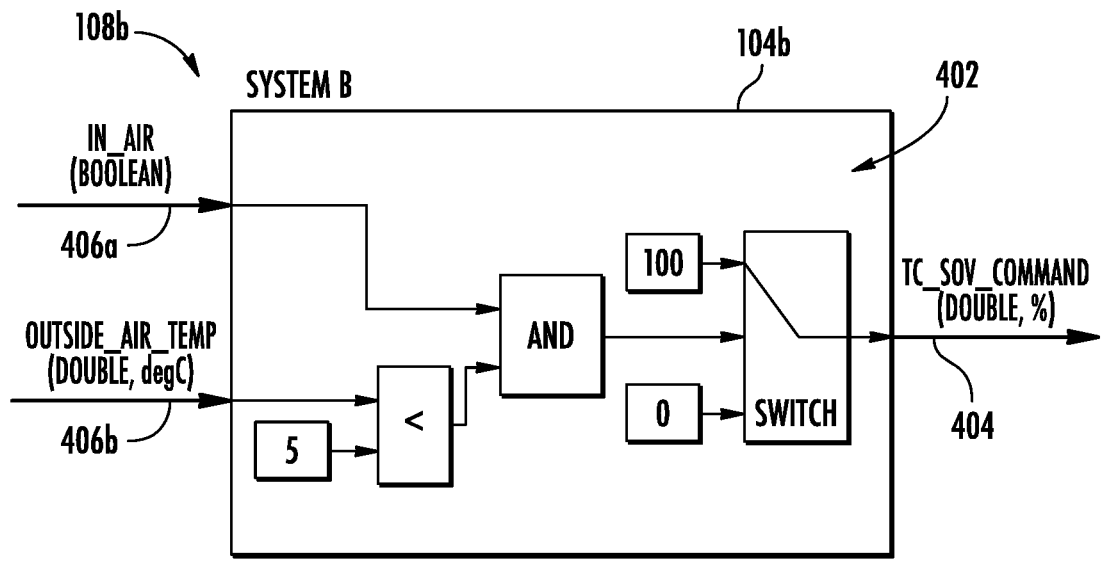
FIG. 4A is an example of a system test harness for a system B in accordance with an example of the present disclosure.
FIG. 4B is an example of a system test case for the system B in accordance with an example of the present disclosure.

FIGS. 1A-1C are a flow chart of an example of a method 100 for automatic generation of integrated test procedures using system test procedures in accordance with an example of the present disclosure. In block 102, the method 100 includes receiving a plurality of system models 104. Each system model 104 is configured to electronically simulate a certain function or a group of functions that a system corresponding to the system model 104 is configured to perform. In this manner, each system model is configured to generate one or more expected outputs in response to one or more inputs depending on the particular system model. The system is any type of system. In accordance with an example, each of the plurality of system models 104 corresponds to a system onboard an airplane or other vehicle. Examples of systems include but are not necessarily limited to a flight control system, engine control system, navigation system, communications system, landing gear system, etc. An example of a system model 104a for a system A is illustrated in FIG. 3A, and an example of a system model 104b for a system B is illustrated in FIG. 4A. Each system model 104a and 104b includes a certain logic circuit, e.g., logic circuit 302 in FIG. 3A and logic circuit 402 in FIG. 4A, that defines the certain function or group of functions that the actual system is configured to perform. Each system model 104a or 104b is configured to generate one or more expected outputs 304 (FIG. 3A), 404 (FIG. 4A) or output signals 304 and 404 in response to one or more inputs 306 (FIG. 3A), 406a and 406b (FIG. 4A) or input signals 306, 406a, 406b based on the certain logic circuit 302, 402 associated with a particular system model 104a, 104b. The logic circuits 302 and 402 are examples for purposes of explanation. Logic circuits for other system models may be much more complex with multiple inputs and outputs depending upon the complexity of the actual system represented by the system model 104.

In block 106, the method 100 includes generating a system test harness 108 for each system model 104 of the plurality of system models 104a and 104b. A test harness is defined as a model that isolates a particular component under test with inputs and outputs configured for testing different scenarios. The component is software, a model, hardware of a combination of all three. The system test harness 108 for each system model 104 is automatically or manually generated. The system test harness 108 is manually generated by a user or operator by: (1) creating a new empty model which becomes the system test harness 108 after completing the next steps; (2) dragging a system model 104 under test into the empty model; (3) creating system test harness input and output ports, e.g., external connections for use in connecting to interacting or interfacing system models; and (4) if applicable, adding logic to calculate related inputs. Manually generating the system test harness 108 is time consuming and prone to errors. There are software tools that can perform steps 1-3 automatically. An example of a software tool for automatically generating a system test harness 108 is Simulink Test™. Simulink® and Simulink Test™ are trademarks of MathWorks, Inc. in the United States, other countries, or both.

Figure 5:
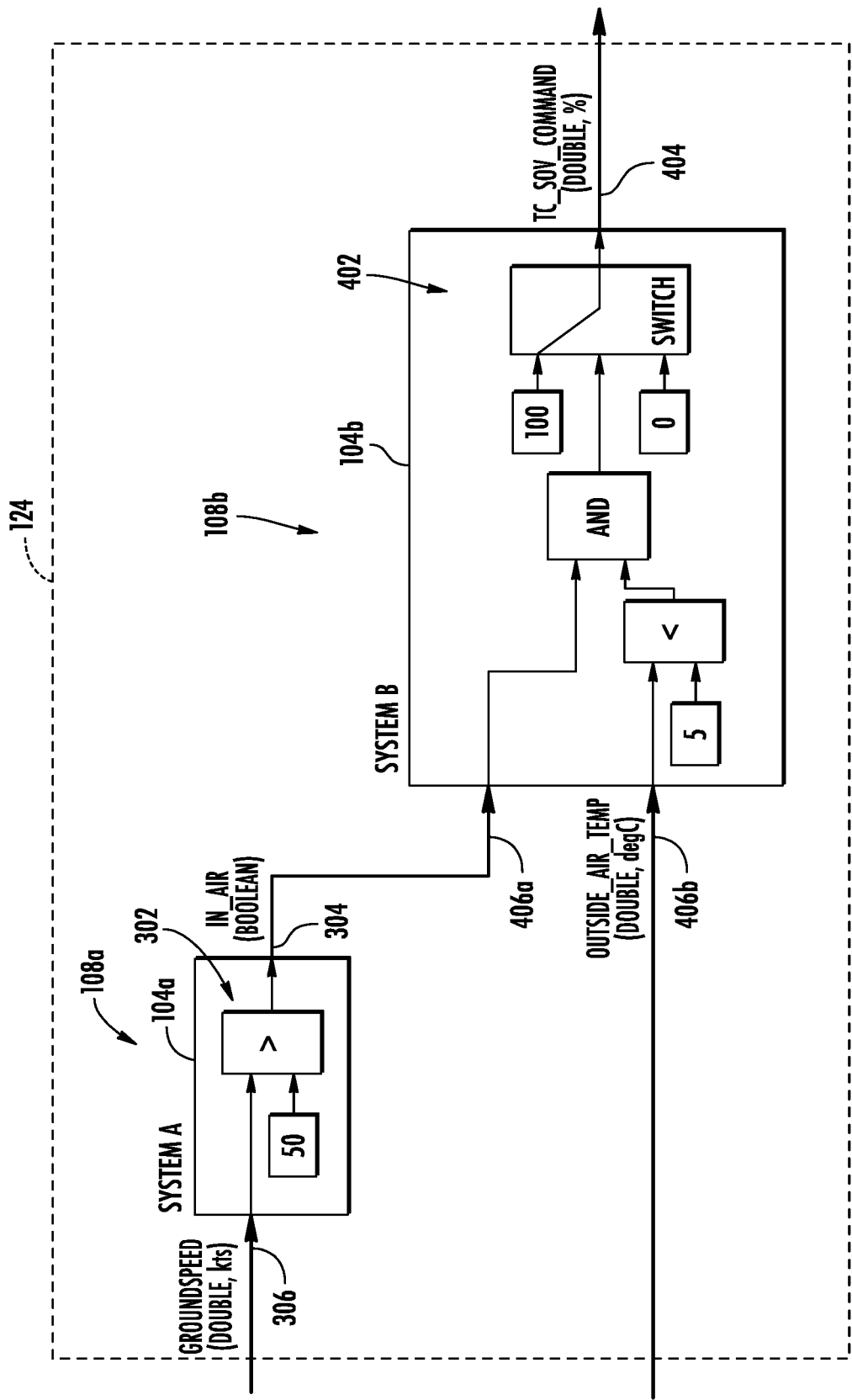
FIG. 5 is an example of an automatically generated integrated test harness for systems A and B in accordance with an example of the present disclosure.

Referring also to FIGS. 3A, 4A and 5, FIG. 3A is an example of a system test harness 108a for the system A in accordance with an example of the present disclosure. FIG. 4A is an example of a system test harness 108b for the system B in accordance with an example of the present disclosure. FIG. 5 is an example of an automatically generated integrated test harness 124 for systems A and B in accordance with an example of the present disclosure. FIG. 5 illustrates that the system A and the system B interface or interact, e.g., system A generates an output signal 304 that is an input signal 406a to system B. However, the system test harnesses 108a and 108b for each system A or B, or system model 104a and 104b are tested independently from each other.

Figure 10:
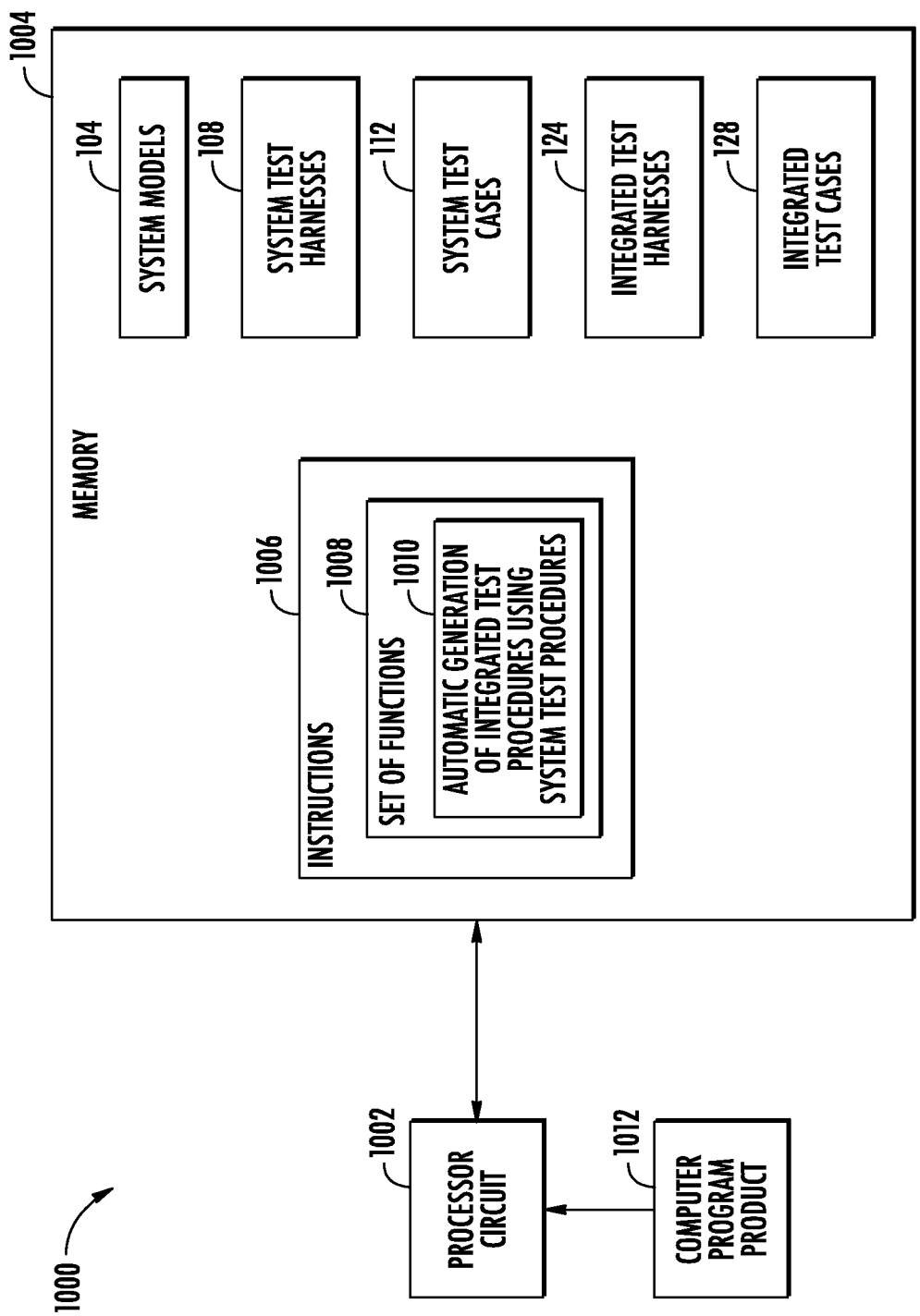
FIG. 10 is an example of a system for automatic generation of integrated test procedures using system test procedures in accordance with an example of the present disclosure.

In block 110, the method 100 includes generating, by a processor circuit, e.g., processor circuit 1002 in FIG. 10, a system test case 112 for each system model 104 of the plurality of system models 104. The system test case 112 for each system model 104 is generated from the system test harness 108 for each system model 104. A single system test harness 108 can be used to execute one or more system test cases 112. A system test case 112 includes at least a purpose of the test case, a set of input conditions, expected results to achieve the required test coverage criteria, and test/fail criteria. Generating the system test case 112 is performed automatically or manually. A system test case 112 is a document describing step-by-step how to verify the behavior of the actual system. Subject matter experts create this document. The system test case 112 is a computer-executable version of the system test case document. The system test case document is created by defining one or more input signals for a particular actual system to create a scenario, e.g., a flight from one destination to another destination. The output signals are also defined as time series with error tolerances to verify the outputs of the system. Creating the system test case 112 manually can be tedious and software tools are available to automatically generate a system test case 112. An example of a software tool for automatically generating a system test case 112 is Simulink Test™ which may also be used with Simulink Design Verifier™. Simulink Design Verifier™ is a trademark of MathWorks, Inc. in the United States, other countries, or both.

Generating the system test case 112 for each system model 104 from the system test harness 108 for each system model 104 includes testing a particular system model 104 separate from an environment of the particular system model 104, e.g., the particular system model 104 is tested independently from other system models 104 that provide inputs to the particular system model 104 or that interact with the particular system model 104.

Figure 3B:
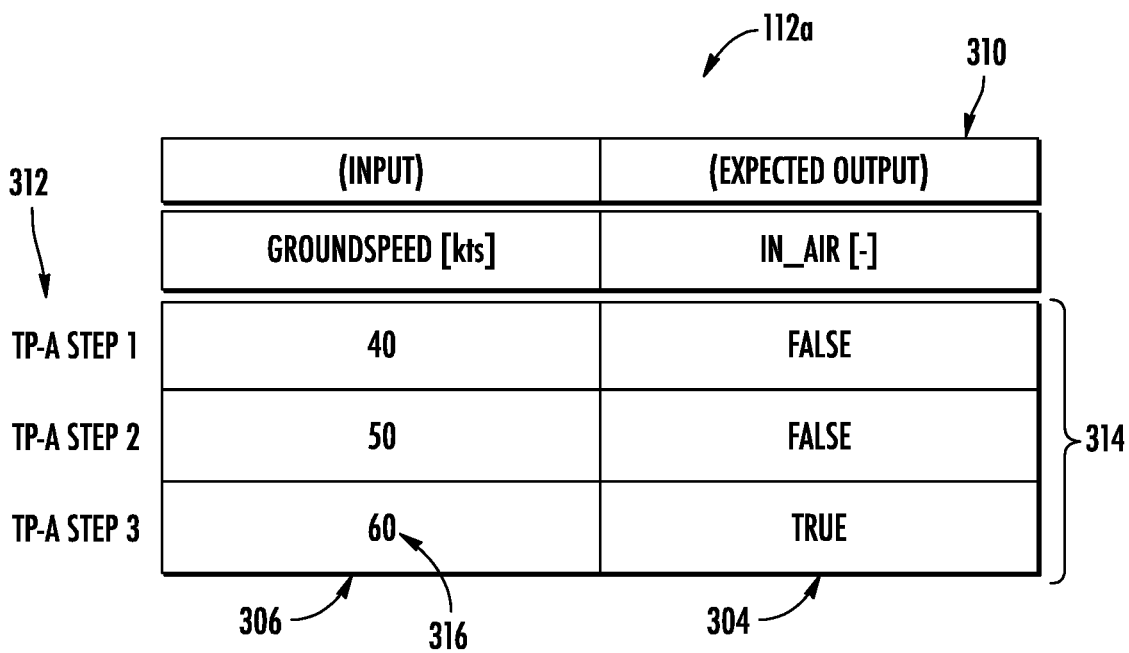
FIG. 3B is an example of a system test case for the system A in accordance with an example of the present disclosure.

Referring also to FIGS. 3B and 4B, FIG. 3B is an example of a system test case 112a for the system A in accordance with an example of the present disclosure. FIG. 4B is an example of a system test case 112b for the system B in accordance with an example of the present disclosure. The system test case 112a, 112b provides a table or datastore 310, 410 that includes an expected output 304, 404 or expected output value 314 for each possible input 306 or input value 316, or combination of inputs 406a and 406b or input values 416a, 416b. Each different possible input 306 or combination of different inputs 406a and 406b define a test step 312 or 412 of the system test case 112a or 112b.

In block 114, the method 100 includes automatically running the system test case 112 using a system test procedure 115 for each system model 104. System test procedures 115 include at least step-by-step instructions for how each test case 112 is to be set up and executed, how the test results are evaluated, and the test environment to be used. The method 100 further includes generating an expected output value 314 (FIG. 3B), 414 (FIG. 4B) for each of one or more outputs 304, 404 of each system model 104a, 104b in response to an input value 316, 416a, 416b for each of the one or more inputs 306, 406a, 406b of each system model 104a, 104b for all combinations of possible different input values 316, 416a, 416b for each system model 104a, 104b. In some examples, the system test procedure includes at least one of a subsystem test procedure, a component test procedure, or a part test procedure.

In accordance with some examples, the method 100 in block 114 includes automatically generating a table or datastore 310 (FIG. 3B), 410 (FIG. 4B) for each system model 104a, 104b independent from other system models 104 in response to running the system test case 112a, 112b for each system model 104a, 104b. The table or datastore 310, 410 for a particular system model 104 includes the expected output value 314, 414 for each of the one or more outputs 304, 404 associated respectively with the input value 316, 416a, 416b for each of the one or more inputs 306, 406a, 406b for each combination of possible different input values 316, 416a, 416b for the particular system model 104a, 104b.

In block 114, the method 100 additionally includes generating a system test procedure coverage report 116. The system test procedure coverage report 116 allows confirmation of the expected output value 314, 414 for each of the one or more outputs 304, 404 associated respectively with the input value 316, 416a, 416b for each of the one or more inputs 306, 406a, 406b for each combination of possible different input values 316, 416a, 416b for the particular system model 104a, 104b.

In block 118, the method 100 includes performing input/output (I/O) management to generate input/output (I/O) data 120. Performing input/output management includes analyzing inputs and outputs of the system models 104 and automatically determining integration of interacting system models 104 based on analysis of the inputs and outputs. Analyzing the inputs and outputs of the system models 104 includes correlating different expected output values of an output or outputs of a first system model 104 to an input or inputs of at least a second system model 104. Output values and corresponding input values are embodied in signals between interacting system models 104. In block 118, the method 100 further includes analyzing the signals between interacting system models in terms of data type, dimension, range of values, units, etc. to generate the input/output data (I/O) 120.

In block 122, the method 100 includes automatically generating, by the processor circuit, e.g., processor circuit 1002 in FIG. 10, one or more integrated test harnesses 124. Each integrated test harness 124 includes a group of interacting system models 104 of the plurality of system models 104. Referring also to FIG. 5, FIG. 5 is an example of an automatically generated integrated test harness 124 for systems A and B in accordance with an example of the present disclosure. The integrated test harness 124 includes the system test harness 108a for system A and the system test harness 108b for system B integrated together. An output signal 304 from one or more of the interacting system models 104a and 104b is an input signal 406a to one or more other interacting system models 104. An integrated test harness 124 is automatically generated for each group of different interacting system models 104 in response to there being more than one group of different interacting system models 104.

Figure 6:
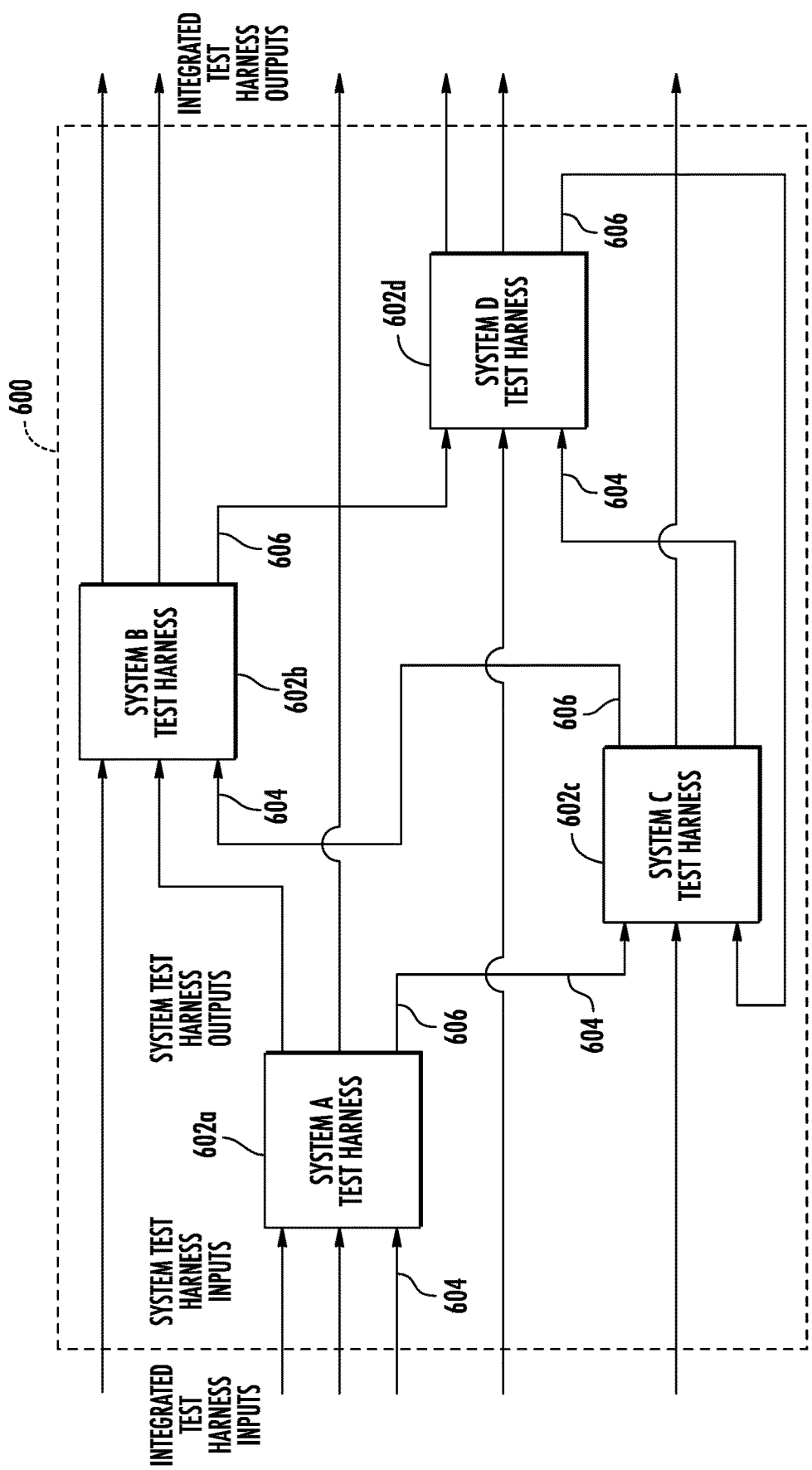
FIG. 6 is another example of an integrated test harness in accordance with an example of the present disclosure.

Referring also to FIG. 6, this is another example of an integrated test harness 600 in accordance with an example of the present disclosure. The exemplary integrated test harness 600 illustrates that an integrated test harness 600 can be complex including a multiplicity of different system test harnesses 602a-602d for a multiplicity of interacting systems, e.g., system A, system B, system C and system D. Each of the system test harnesses 602a-602d were generated independent of the other system test harnesses 602a-602d. In the example in FIG. 6, each of the system test harnesses 602a-602d includes a plurality of inputs 604 and outputs 606. Outputs 606 of some system test harnesses 602a-602d correspond to inputs 604 for other system test harnesses 602a-602d.

Figure 7:
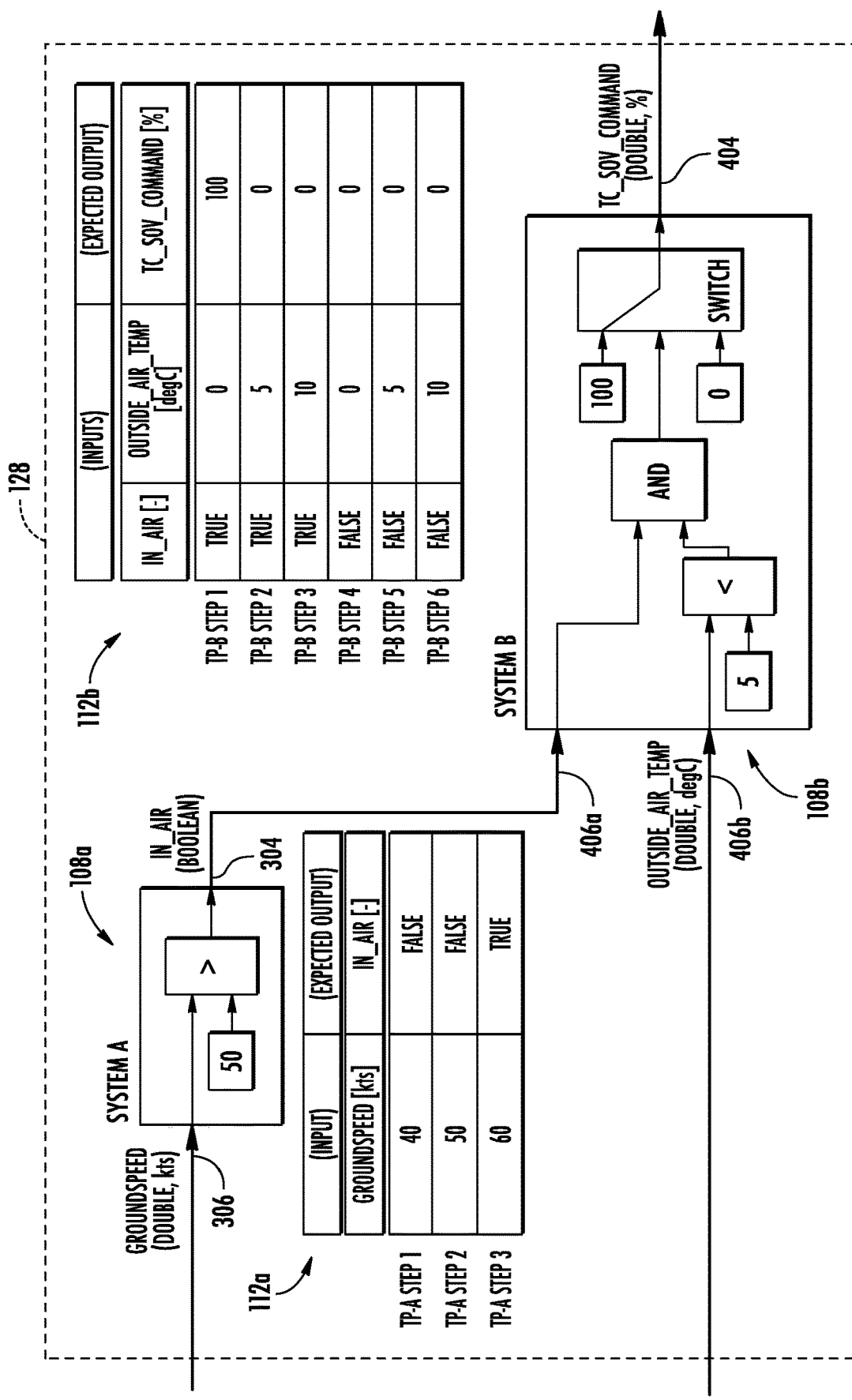
FIG. 7 is an example of an automatically generated integrated test case for systems A and B in accordance with an example of the present disclosure.

In block 126 of FIG. 1B, the method 100 additionally includes automatically generating, by the processor circuit, e.g., the processor circuit 1002 in FIG. 10, one or more integrated test cases 128 using the system test case 112 for each system model 104 in the integrated test harness 124. In some examples, the input/output data 120 is also used to generate the integrated test case 128 for each integrated test harness 124. An integrated test case 128 is automatically generated for each integrated test harness 124. Referring also to FIG. 7, this is an example of an automatically generated integrated test case 128 for systems A and B in accordance with an example of the present disclosure. The integrated test case 128 includes the system test cases 112a and 112b for systems A and B integrated together. An example of a method 200 for automatically generating integrated test harnesses 124 and integrated test cases 128 will be described in more detail with reference to FIG. 2. As described with reference to the exemplary method in FIG. 2, automatically generating one or more integrated test cases 128 for each integrated test harness 124 using the system test case 112 for each system model 104 includes interconnecting I/O data 120 from the system test case 112 of each system model 104 including inputs and expected outputs. Automatically generating the one or more integrated test cases 128 also includes determining critical inputs and removing superfluous test steps as also described in the example in FIG. 2.

In block 130, the method 100 includes automatically running, by the processor circuit, the integrated test case 128 using an associated integrated test procedure 131 and generating, by the processor circuit, an integrated test procedure coverage report 132 in response to running the integrated test case 128. The integrated test procedure coverage report 132 identifies which parts of the system models 104 or code defining the integrated test case 128 were not executed. The integrated test procedure 131 includes at least step-by-step instructions for how each integrated test case 128 is to be set up and executed, how the test results are evaluated, and the test environment to be used. In accordance with an example, the integrated test procedures 131 include at least a combination of the system test procedures for systems A and B.

In block 134, the method 100 includes performing analysis of the integrated test procedure coverage report 132 and generating an integrated systems analysis report 136 in response to performing analysis of the integrated test procedure coverage report 132. Performing analysis of the integrated test procedure coverage report 132 includes analyzing of the parts of the integrated test case 128 that were not executed and providing an explanation why conditions defined in the integrated test case 128 were not reached. For example, the method 100 identifies which combination of input signals to the integrated test harness 124 are missing, or the not-executed part of the integrated test case 128 cannot be reached by inputs to the integrated test harness 124. If there are gaps in the integrated test procedure coverage report 132, the integrated systems analysis report 136 provides information how to obtain substantially one hundred percent (100%) coverage by the integrated test harness 124 and integrated test case 128.

Figure 2:
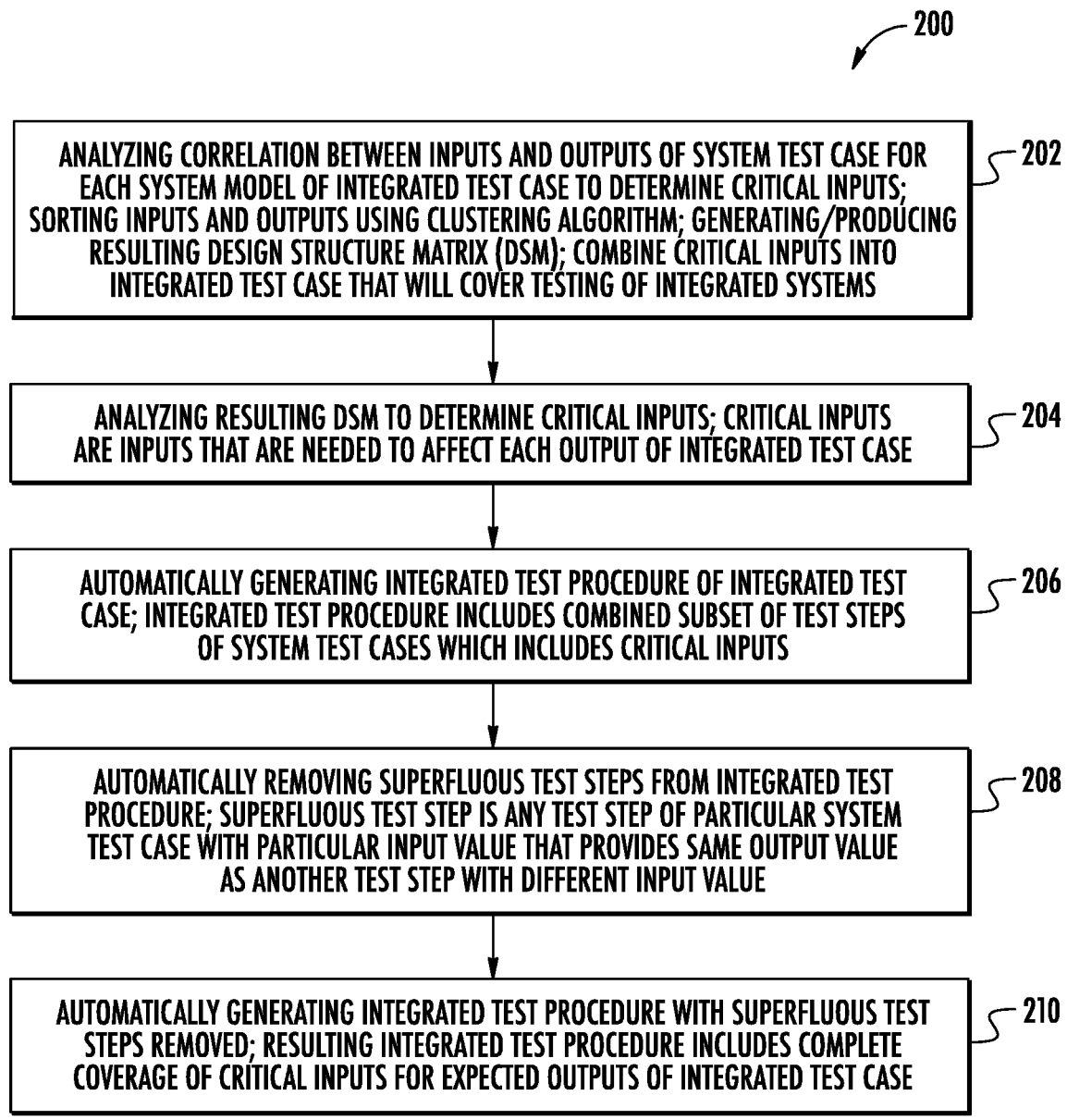
FIG. 2 is a flow chart of an example of a method for automatically generating integrated test harnesses and integrated test cases in accordance with an example of the present disclosure.

FIG. 2 is a flow chart of an example of a method 200 for automatically generating integrated test harnesses 124 and integrated test cases 128 in accordance with an example of the present disclosure. In block 202, the method 200 includes analyzing a correlation between one or more inputs 306, 406a, 406b and one or more outputs 404 of the integrated test case 128 to determine a group of critical inputs 306 and 406b (FIG. 8B). The group of critical inputs 306 and 406b are the inputs that are needed to affect each output 404 of the integrated test case 128. Analyzing the correlation between the inputs 306, 406a and 406b and outputs 404 of the integrated test case 128 includes sorting the inputs and outputs using an algorithm to determine the group of critical inputs 306, 406a.

In accordance with an example, analyzing the correlation between inputs 306, 406a, 406b and outputs 404 of the integrated test case 128 includes using a clustering algorithm, e.g., a design structure matrix (DSM) algorithm 800, as illustrated in FIGS. 8A and 8B, to determine the group of critical inputs 306 and 406b. In an example, using the DSM algorithm 800 includes generating or producing a resulting DSM 801 (FIG. 8B) that is analyzed as described herein for determining the group of critical inputs 306 and 406b. The critical inputs are combined into an integrated test case 128 that will cover testing of the integrated systems corresponding to the system models 104. While the DSM algorithm 800 is described herein, any algorithm for sorting inputs and outputs to determine the group of critical inputs 306 and 406b can be used. Referring also to FIGS. 8A and 8B, FIGS. 8A and 8B illustrate an example of analyzing a correlation between inputs 306, 406a and 406b and outputs 404 of the integrated test case 128 in the example in FIG. 7 to determine the critical inputs using a DSM algorithm 800. FIG. 8A illustrates operation of the DSM algorithm 800 in which an "X" is placed in those cells of the DSM 801 where a signal corresponding to a row 802 of the DSM 801 depends on a particular signal corresponding to a column 804 of the DSM 801. In the example in FIG. 8A, the row input signal "ia" 406a (in_air input signal) depends on the column input signal "gs" 306 (groundspeed signal) as indicated by the "X"

in cell 808 of FIG. 8A and as also illustrated in the exemplary integrated test case 128 in FIG. 7. The row output signal "sov" 404 depends on the column input signal "ia" 406*a* as indicated by the "X" in cell 810 and the column input signal "oat" 406*b* as indicated by the "X" in cell 812 in FIG. 8A and as also illustrated in the exemplary integrated test case 128 in FIG. 7.

In block 204, the method 200 includes analyzing the resulting DSM 801 (FIG. 8B) to determine the critical inputs. The critical inputs are the inputs that are needed for each output of the integrated test case 128. As illustrated in FIG. 8B, the row input signal "ia" 406*a* depends upon the column input signal "gs" 306 as determined by the DSM algorithm 800. Accordingly, the critical inputs for determining the row output "sov" 404 are the column input signals "gs" 306 and "oat" 406*b* as indicated in the example illustrated in FIG. 8B.

Figure 9A:
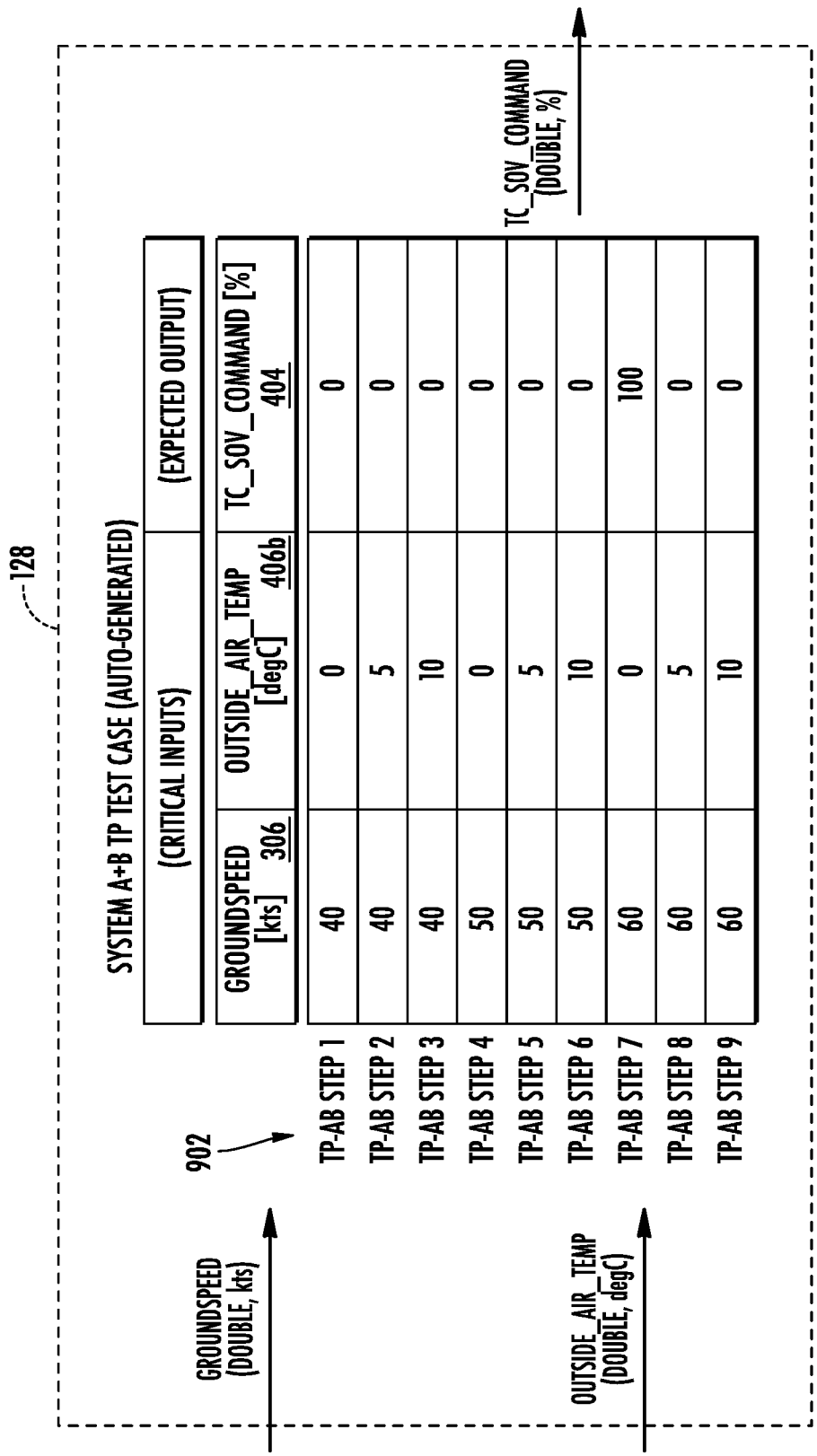
FIG. 9A is an example of automatically generating an integrated test procedure for the integrated test case in the example in FIG. 7.

In block 206, the method 200 includes automatically generating the integrated test procedure 131 of the integrated test case 128. The integrated test procedure 131 includes a combined subset of test steps 312 (FIG. 3B), 412 (FIG. 4B) of the system test cases 112*a* and 112*b* which include the critical inputs 306 and 406*b*. Referring also to FIG. 9A, this is an example of automatically generating integrated test steps 902 for the integrated test procedure 131 of the integrated test case 128 in the example in FIG. 7. Each integrated test step 902 includes a different combination of critical inputs 306 and 406*b* or critical input values for the integrated test procedure 131 of the integrated test case 128.

Figure 9B:
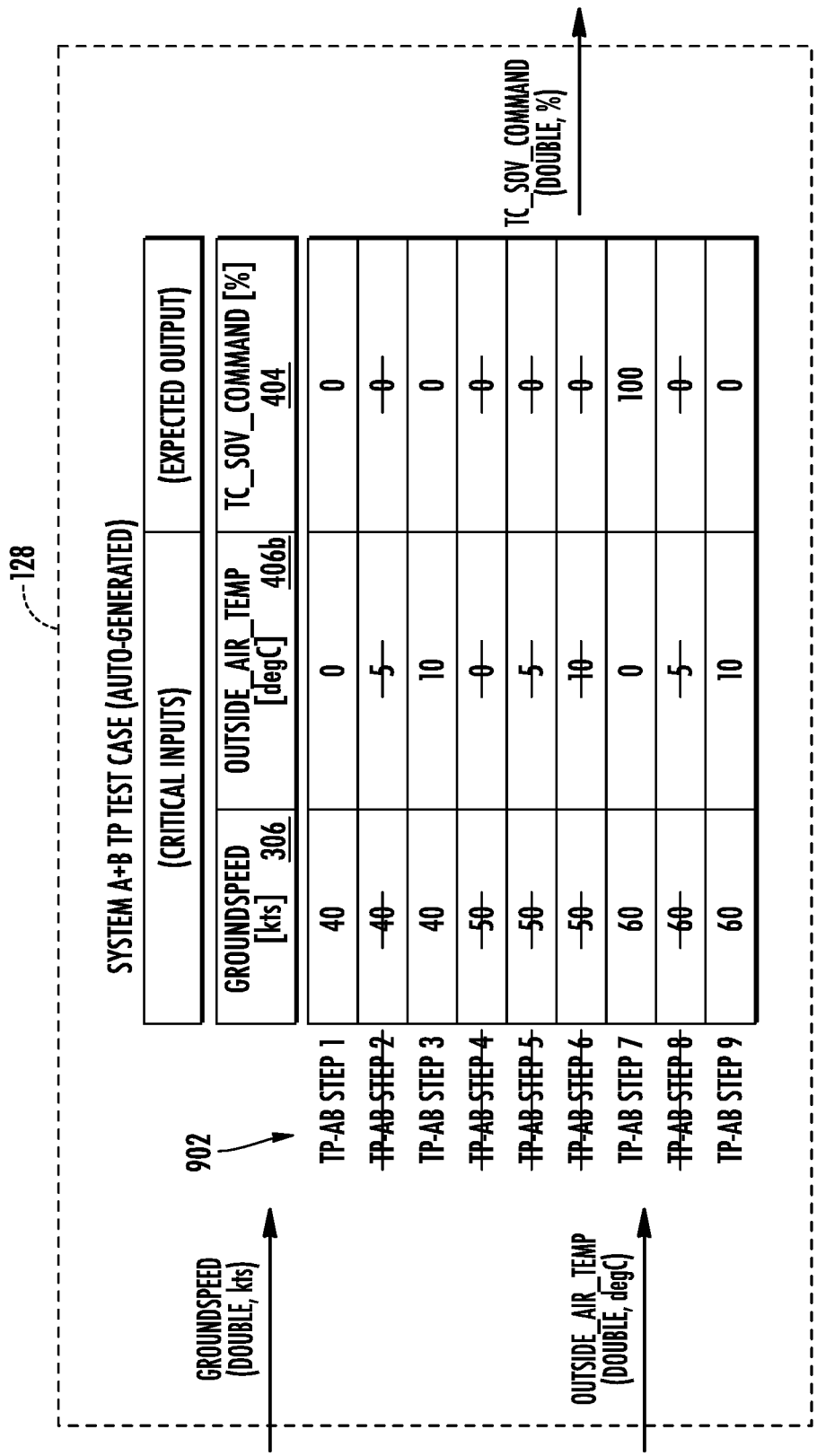
FIG. 9B is an example of automatically removing superfluous test steps for each system from the integrated test procedure in the example in FIG. 9A.

In block 208, the method 200 includes automatically removing one or more superfluous integrated test steps 902 from the integrated test procedure 131 to reduce a time duration for running the integrated test case 128. A superfluous integrated test step 902 is any test step 902 of a particular system test case 112*a* or 112*b* with a particular input value 316 that provides a same output value 414 as another test step 902 with a different input value. Referring also to FIG. 9B, this is an example of automatically removing superfluous integrated test steps 902 for each system test case 112*a* or 112*b* in the integrated test procedure 131 in the example in FIG. 9A. The superfluous integrated test steps 902 which are removed are illustrated as being stricken-through in FIG. 9B.

In block 210, the method 200 further includes automatically generating the integrated test procedure 131 with the one or more superfluous integrated test steps 902 removed. The integrated test procedure 131 that results after removing the superfluous integrated test steps includes a coverage of critical inputs 306 and 406*b* for expected outputs 404 of the integrated test case 128.

FIG. 10 is an example of a system 1000 for automatic generation of integrated test procedures using system test procedures in accordance with an example of the present disclosure. In accordance with an embodiment, the method 100 of FIGS. 1A-1C and the method 200 of FIG. 2 are embodied in and performed by the system 1000. However, any system capable of performing the operations described herein may be used. The system 1000 includes a processor circuit 1002 and a memory 1004 associated with the processor circuit 1002. The memory 1004 includes computer readable program instructions 1006 that, when executed by the processor circuit 1002 cause the processor circuit 1002 to perform a set of functions 1008. In accordance with an example, the set of functions 1008 include automatic generation of integrated test procedures using system test procedures 1010 as described herein. The method 100 of FIGS. 1A-1C and the method 200 of FIG. 2 are embodied in the set of functions and are performed by the processor circuit 1002.

In some examples, the computer readable program instructions 1006 are embodied in a computer program product 1012 that is similar to or the same as that described herein. The computer readable program instructions 1006 are downloaded by the processor circuit 1002 and stored on the memory 1004.

Further, the disclosure comprises the following examples, whereby the scope of protection is provided by the claims.

Example 1. A method for automatic generation of integrated test procedures using system test procedures, the method comprising: generating, by a processor circuit, a system test case for each system model of a plurality of system models; automatically generating, by the processor circuit, an integrated test harness comprising a group of interacting system models of the plurality of system models, wherein an output signal from one or more of the interacting system models is an input signal to one or more other interacting system models; automatically generating, by the processor circuit, an integrated test case using the system test case for each system model in the integrated test harness; automatically running, by the processor circuit, the integrated test case using an integrated test procedure; and generating, by the processor circuit, an integrated test procedure coverage report in response to running the integrated test case.

Example 2. The method of example 1, further comprising analyzing a correlation between one or more inputs and one or more outputs of the integrated test case to determine a group of critical inputs, wherein the group of critical inputs are the inputs that are needed to affect each output of the integrated test case.

Example 3. The method of example 2, wherein analyzing the correlation between the inputs and outputs of the integrated test case comprises sorting the inputs and outputs using a clustering algorithm to determine the group of critical inputs.

Example 4. The method of example 2, further comprising automatically generating the integrated test procedure of the integrated test case, wherein the integrated test procedure comprises a combined subset of test steps of the system test cases which include the critical inputs.

Example 5. The method of any of examples 1-4, further comprising automatically removing one or more superfluous test steps from the integrated test procedure to reduce a time duration for running the integrated test case, wherein a superfluous test step is any test step of a particular system test case with a particular input value that provides a same output value as another test step with a different input value.

Example 6. The method of example 5, further comprising automatically generating the integrated test procedure with the one or more superfluous test steps removed, the integrated test procedure that results comprising a coverage of critical inputs for expected outputs of the integrated test case.

Example 7. The method of any of examples 1-6, further comprising receiving the plurality of system models, wherein each system model is configured to electronically simulate a certain function or a group of functions that the system is configured to perform.

Example 8. The method of example 7, wherein each system model comprises a certain logic circuit that defines the certain function or group of functions that the system is configured to perform.

Example 9. The method of example 8, wherein each system model is configured to generate one or more expected outputs in response to one or more inputs based on the certain logic circuit associated with a particular system model.

Example 10. The method of any of examples 1-9, further comprising generating a system test harness for each system model of the plurality of system models, wherein the system test case for each system model is generated from the system test harness for each system model.

Example 11. The method of example 10, wherein generating the system test case for each system model from the system test harness for each system model comprises testing a particular system model separate from an environment of the particular system model so that the particular system model is tested independently from other system models that provide inputs to the particular system model.

Example 12. The method of any of examples 1-11, further comprising: automatically running the system test case using a system test procedure for each system model; and generating an expected output value for each of one or more outputs of each system model in response to an input value for each of one or more inputs of each system model for all combinations of possible different input values for each system model.

Example 13. The method of example 12, wherein the system test procedure comprises at least one of a subsystem test procedure, a component test procedure, or a part test procedure.

Example 14. The method of example 12, further comprising automatically generating a table or datastore for each system model independent from other system models in response to running the system test case for each system model, the table or datastore for a particular system model comprising the expected output value for each of the one or more outputs associated respectively with the input value for each of the one or more inputs for each combination of possible different input values for the particular system model.

Example 15. The method of any of examples 1-14, further comprising: performing analysis of the integrated test procedure coverage report; and generating an integrated systems analysis report in response to performing analysis of the integrated test procedure coverage report.

Example 16. The method of any of examples 1-15, wherein each of the plurality of system models corresponds to a system onboard an airplane or other vehicle.

Example 17. A system for automatic generation of integrated test procedures using system test procedures, the system comprising: a processor circuit; and a memory associated with the processor circuit, the memory comprising computer readable program instructions that, when executed by the processor circuit cause the processor circuit to perform a set of functions comprising: generating a system test case for each system model of a plurality of system models; automatically generating an integrated test harness comprising a group of interacting system models of the plurality of system models, wherein an output signal from one or more of the interacting system models is an input signal to one or more other interacting system models; automatically generating an integrated test case using the system test case for each system model in the integrated test harness; automatically running the integrated test case using an integrated test procedure; and generating an integrated test procedure coverage report in response to running the integrated test case.

Example 18. The system of example 17, wherein the set of functions further comprises analyzing a correlation between one or more inputs and one or more outputs of the integrated test case to determine a group of critical inputs, wherein the group of critical inputs are the inputs that are needed to affect each output of the integrated test case.

Example 19. The system of example 18, wherein the set of functions further comprises automatically generating the integrated test procedure of the integrated test case, wherein the integrated test procedure comprises a combined subset of test steps of the system test cases which include the critical inputs.

Example 20. The system of example 17, wherein the set of functions further comprises: automatically removing one or more superfluous test steps from the integrated test procedure to reduce a time duration for running the integrated test case, wherein a superfluous test step is any test step of a particular system test case with a particular input value that provides a same output value as another test step with a different input value; and automatically generating the integrated test procedure with the one or more superfluous test steps removed, the integrated test procedure that results comprising a coverage of critical inputs for expected outputs of the integrated test case.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for automatic generation of integrated test procedures using system test procedures, the method comprising:
generating, by a processor circuit, a system test procedure test case for each system model of a plurality of system models;
automatically generating, by the processor circuit, an integrated test procedure test harness comprising a group of interacting system models of the plurality of system models, an output signal from one or more of the interacting system models being an input signal to one or more other interacting system models;
automatically generating, by the processor circuit, an integrated test procedure test case using the system test procedure test case for each system model in the integrated test procedure test harness;
automatically running, by the processor circuit, the integrated test procedure test case;
analyzing a correlation between one or more inputs and one or more outputs of the integrated test procedure test case to determine a group of critical inputs, the group of critical inputs being the inputs that are needed to affect each output of the integrated test procedure test case; and
generating, by the processor circuit, an integrated test procedure coverage report in response to running the integrated test procedure test case.

2. The method of claim 1, wherein analyzing the correlation between the inputs and outputs of the integrated test procedure test case comprises sorting the inputs and outputs using a clustering algorithm to determine the group of critical inputs.

3. The method of claim 1, further comprising:
automatically generating a plurality of test procedure steps of the integrated test procedure test case,
wherein the plurality of test procedure steps comprise a combined subset of test procedure steps of the system test procedure test cases which include the critical inputs.

4. The method of claim 1, further comprising:
automatically removing one or more superfluous test steps from the integrated test procedure test case to reduce a time duration for running the integrated test procedure test case,
wherein a superfluous test step is any test step of a particular system test procedure test case with a particular input that provides a same output as another test step with a different input.

5. The method of claim 4, further comprising:
automatically generating the integrated test procedure test case with the one or more superfluous test steps removed,
wherein the integrated test procedure test case comprises a coverage of critical inputs for expected outputs of the integrated test procedure test case.

6. The method of claim 1, further comprising:
receiving the plurality of system models,
wherein each system model is configured to electronically simulate a certain function or a group of functions that the system is configured to perform.

7. The method of claim 6, wherein each system model comprises a certain logic circuit that defines the certain function or group of functions that the system is configured to perform.

8. The method of claim 7, wherein each system model is configured to generate one or more expected outputs in response to one or more inputs based on the certain logic circuit associated with a particular system model.

9. The method of claim 1, further comprising:
automatically generating a system test procedure test harness for each system model of the plurality of system models,
wherein the system test procedure test case is generated using the system test procedure test harness for each system model.

10. The method of claim 9, wherein automatically generating the system test procedure test harness for each system model comprises separating a particular system model from an environment of the particular system model so that the particular system model is independent from other system models that provide inputs to the particular system model.

11. The method of claim 9, wherein the system test procedure test harness comprises at least one of:
a subsystem test procedure;
a component test procedure; and
a part test procedure.

12. The method of claim 1, further comprising:
automatically running the system test procedure test case for each system model; and
generating an expected output value for each of one or more outputs of each system model in response to an input value for each of one or more inputs of each system model for all combinations of possible different input values for each system model.

13. The method of claim 12, further comprising:
automatically generating a table or datastore for each system model independent from other system models in response to running the system test procedure test case for each system model,
wherein the table or datastore for a particular system model comprises the expected output value for each of the one or more outputs associated respectively with the input value for each of the one or more inputs for each combination of possible different input values for the particular system model.

14. The method of claim 1, further comprising:
performing analysis of the integrated test procedure coverage report; and
generating an integrated systems analysis report in response to performing analysis of the integrated test procedure coverage report.

15. The method of claim 1, wherein each of the plurality of system models corresponds to a system onboard an airplane or other vehicle.

16. A system for automatic generation of integrated test procedures using system test procedures, the system comprising:
a processor circuit; and
a memory associated with the processor circuit, the memory comprising computer readable program instructions that, when executed by the processor circuit cause the system to perform operations comprising:

generating, by a processor circuit, a system test procedure test case for each system model of a plurality of system models;

automatically generating, by the processor circuit, an integrated test procedure test harness comprising a group of interacting system models of the plurality of system models, an output signal from one or more of the interacting system models being an input signal to one or more other interacting system models;

automatically generating, by the processor circuit, an integrated test procedure test case using the system test procedure test case for each system model in the integrated test procedure test harness;

automatically running, by the processor circuit, the integrated test procedure test case;

analyzing a correlation between one or more inputs and one or more outputs of the integrated test procedure test case to determine a group of critical inputs, the group of critical inputs being the inputs that are needed to affect each output of the integrated test procedure test case; and generating, by the processor circuit, an integrated test procedure coverage report in response to running the integrated test procedure test case.

17. The system of claim 16, the operations further comprise:
automatically generating a plurality of test procedure steps of the integrated test procedure test case,
wherein the plurality of test procedure steps comprise a combined subset of test procedure steps of the system test procedure test cases which include the critical inputs.

18. The system of claim 16, the operations further comprise:
automatically removing one or more superfluous test steps from the integrated test procedure test case to reduce a time duration for running the integrated test procedure test case, a superfluous test step being any test step of a particular system test procedure test case with a particular input that provides a same output as another test step with a different input; and
automatically generating the integrated test procedure test case with the one or more superfluous test steps removed, the integrated test procedure test case comprising a coverage of critical inputs for expected outputs of the integrated test procedure test case.

19. A non-transitory computer readable medium including instructions storied therein that are executable by a processing circuit to perform operations comprising:
generating, by a processor circuit, a system test procedure test case for each system model of a plurality of system models;

automatically generating, by the processor circuit, an integrated test procedure test harness comprising a group of interacting system models of the plurality of system models, an output signal from one or more of the interacting system models being an input signal to one or more other interacting system models;

automatically generating, by the processor circuit, an integrated test procedure test case using the system test procedure test case for each system model in the integrated test procedure test harness;

automatically running, by the processor circuit, the integrated test procedure test case;

analyzing a correlation between one or more inputs and one or more outputs of the integrated test procedure test case to determine a group of critical inputs, the group of critical inputs being the inputs that are needed to affect each output of the integrated test procedure test case; and generating, by the processor circuit, an integrated test procedure coverage report in response to running the integrated test procedure test case.

20. The non-transitory computer readable medium of claim 19, the operations further comprising:
automatically removing one or more superfluous test steps from the integrated test procedure test case to reduce a time duration for running the integrated test procedure test case, the superfluous test step being any test step of a particular system test procedure test case with a particular input that provides a same output as another test step with a different input;
receiving the plurality of system models, each system model being configured to electronically simulate a certain function or a group of functions that the system is configured to perform; and
automatically generating a system test procedure test harness for each system model of the plurality of system models, the system test procedure test case being generated using the system test procedure test harness for each system model.

* * * * *